(12) United States Patent
Linden et al.

(10) Patent No.: US 6,690,267 B2
(45) Date of Patent: Feb. 10, 2004

(54) REMOTELY CONTROLLABLE BICYCLE LOCK AND ALARM SYSTEM

(76) Inventors: Edward A. Linden, 310 S. Williams Blvd., Suite 150, Tucson, AZ (US) 85711; Charles P. Marschhausen, 11336 N. Copper Springs Trail, Tucson, AZ (US) 85737

( * ) Notice: Subject to any disclaimer, the term of this patent is extended or adjusted under 35 U.S.C. 154(b) by 19 days.

(21) Appl. No.: 10/153,528

(22) Filed: May 22, 2002

(65) Prior Publication Data

US 2003/0218536 A1 Nov. 27, 2003

(51) Int. Cl.[7] .................................................. B62J 3/00
(52) U.S. Cl. ....................... 340/432; 340/427; 340/426; 340/539.1; 340/539.11; 340/541; 340/542; 340/572.9; 340/687; 340/568.2
(58) Field of Search ................................. 340/427, 432, 340/426, 539.1, 568.1, 568.2, 571, 572.9, 687, 686.4, 539.11, 541, 542; 70/233, 38 A, 26

(56) References Cited

U.S. PATENT DOCUMENTS 5,408,213 A * 4/1995 Ungarsohn ................... 340/427
6,243,005 B1 * 6/2001 Haimovich et al. .......... 340/427

* cited by examiner

*Primary Examiner*—Daryl Pope

(57) ABSTRACT

The invention provides a remotely controllable bicycle lock and alarm system and a remote control device enabled to facilitate communication between the a remote control device and the lock and alarm system. Also provided in the lock and alarm system is an audible alarm for notification of the bicycle operator.

19 Claims, 2 Drawing Sheets

Fig. 2
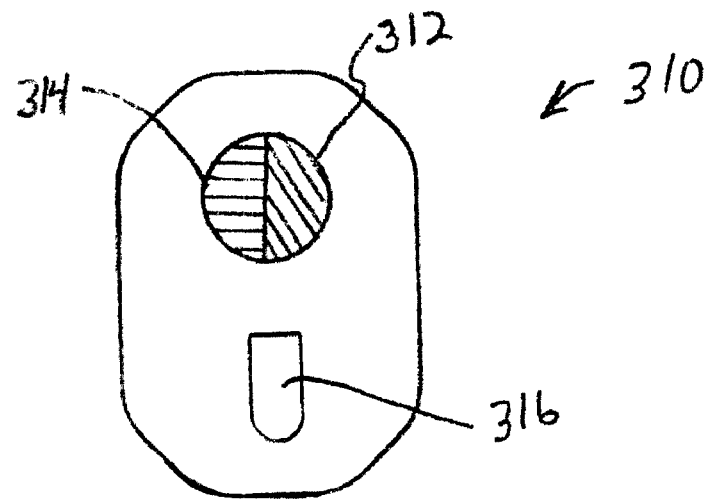
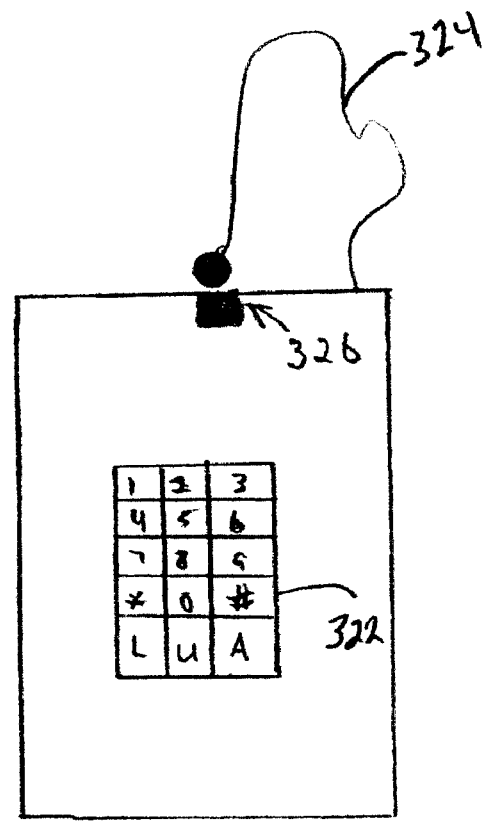

REMOTELY CONTROLLABLE BICYCLE LOCK AND ALARM SYSTEM

TECHNICAL FIELD

Generally, the invention relates to the field of locking and alarm devices, and more particularly, to bicycle locks and alarm systems.

STATEMENT OF A PROBLEM ADDRESSED BY THIS INVENTION

Bicycles are often stolen, and if recovered, frequently have damage that is irreparable. Replacing a stolen or damaged bicycle is expensive and time consuming. To keep bicycles from being stolen, many bicycle riders turn to bicycle locks.

Bicycle locks tend to be heavy, bulky, and cumbersome to lock and unlock. Because securing a bicycle is difficult, bicycle locks and restraints require a significant amount of dexterity to lock or unlock. To a student trying to get from class to class at a university or other school, or to a delivery person who uses a bicycle, the difficulty of locking a bike makes locking and unlocking the bike impractical, while the time it takes to lock and unlock the bicycle makes getting from class to class on time difficult. The result is that some of the very people who need to lock a bicycle the most, never do.

Accordingly, to overcome these and other disadvantages associated with bicycle locking mechanisms, it would be advantageous to have a bicycle lock and alarm system that locks and unlocks quickly, and alerts a user of an ongoing theft or bicycle tampering. The invention disclosed herein provides such an invention.

SELECTED OVERVIEW OF SELECTED EMBODIMENTS

The invention provides technical and operational advantages as a remotely controlled bicycle lock and alarm system. Generally, the invention is a remotely controlled bicycle lock and alarm system including a radio wave processor enabled to receive a communication from a remote control device. Coupled to the radio wave processor is a control circuit. A sound generator, a locking mechanism, and an input/out system are also coupled to the control circuit. The control circuit is enabled to lock and unlock the locking mechanism.

In another embodiment, the invention is a remote control system (the remote control system) that is enabled to at least remotely lock and unlock a bicycle lock. The remote control system includes a radio wave processor, and a control circuit enabled to implement an alarm function. A locking mechanism and an input/output device are both coupled to the control circuit. Accordingly, the invention provides a user the ability to quickly and remotely lock and unlock their bicycle, and notifies a user of a tampering with their bicycle.

Of course, other features and embodiments of the invention will be apparent to those of ordinary skill in the art. After reading the specification, and the detailed description of the exemplary embodiment, these persons will recognize that similar results can be achieved in not dissimilar ways. Accordingly, the detailed description is provided as an example of the best mode of the invention and it should be understood that the invention is not limited by the detailed description. Accordingly, the invention should be read as being limited only by the claims.

BRIEF DESCRIPTION OF THE DRAWINGS

Various aspects of the invention, as well as an embodiment, are better understood by reference to the following EXEMPLARY EMBODIMENT OF A BEST MODE. To better understand the invention, the EXEMPLARY EMBODIMENT OF A BEST MODE should be read in conjunction with the drawings in which:

FIG. 2 shows an external view of a remotely controllable bicycle lock and alarm system, particularly showing selected interface components.

AN EXEMPLARY EMBODIMENT OF A BEST MODE

Figure 1:
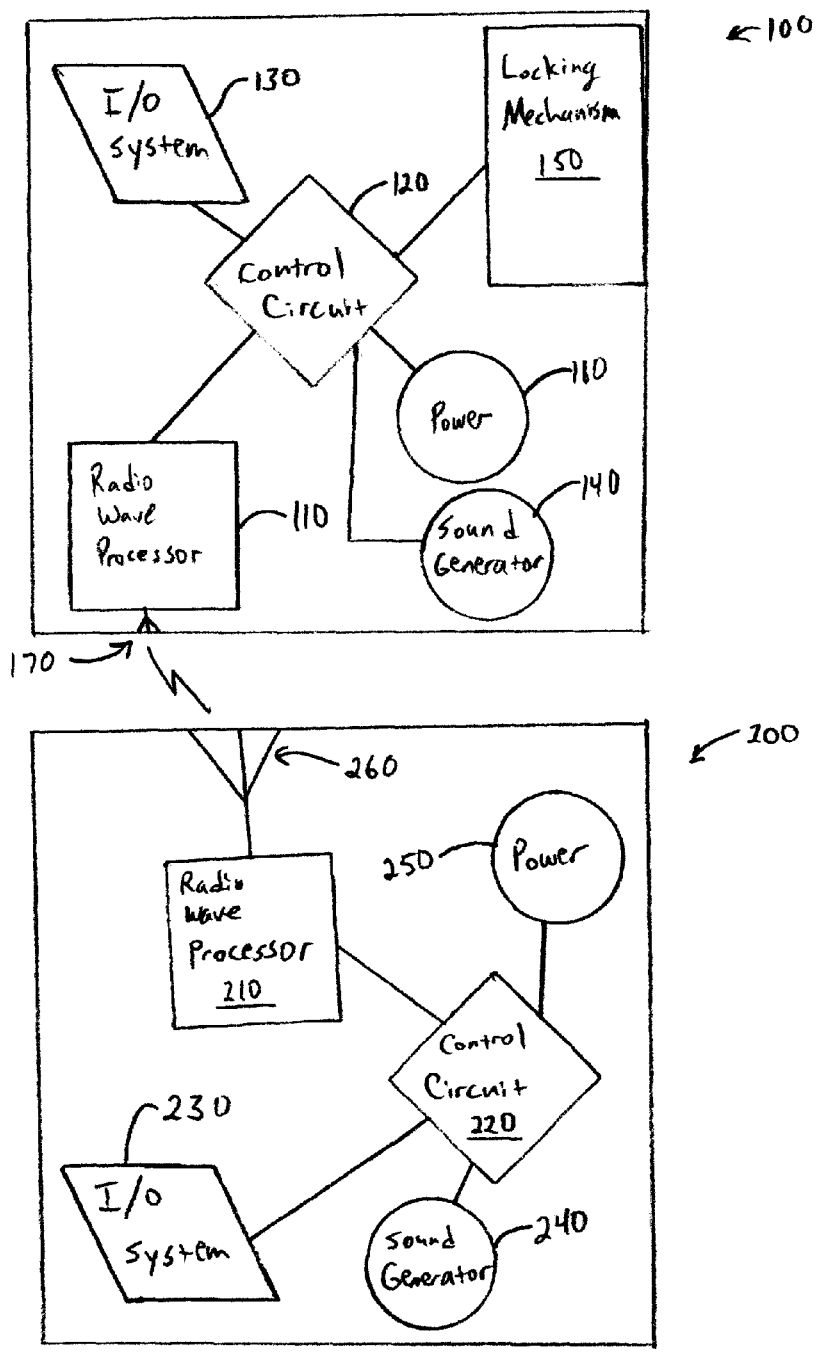
FIG. 1 shows a remotely controllable bicycle lock and alarm system with a remote control system.

The invention provides inventive embodiments that allow for theft prevention through a remotely controlled bicycle locking mechanism and alarm system. Thus, the invention provides a remotely controllable bicycle lock and alarm system (the lock and alarm system). The invention also provides is a remote control system (the remote control system) that is enabled to at least remotely lock and unlock a bicycle lock. The remote control system also has a control circuit enabled to generate a bit stream that uniquely identifies a lock and alarm system code.

Accordingly, the invention provides for remote operation of a bicycle lock, enabling a user of the system to remotely lock and unlock the locking mechanism of the bicycle lock en-route to or from a bicycle. This capability allows the operator to save valuable time that might otherwise be spent fumbling with an exclusively mechanical lock, and avoids the need to have surgeon-like dexterity to operate a bicycle lock. Another advantage of the invention is that it provides the ability to send and receive an alarm message remotely, ensuring user notification of tampering or attempted theft when the user is away from the bicycle lock. Further, a user operator can alter codes needed to lock or unlock the locking mechanism, ensuring even greater security. Thus, the benefits listed are among the invention's many advantages that are readily apparent to those of ordinary skill in the art.

Interpretation Considerations

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus.

Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means"or "step" as defined in 112, paragraph 6 of 35 U.S.C., unless used as "means for functioning-" or "step" for-functioning-"in the Claims section.

Exemplary Devices

Features and advantages of the invention are better understood by reference to the drawings. Accordingly, FIG. 1 is a remotely controllable bicycle lock and alarm system (the lock and alarm system) 100 that includes a radio wave processor 110. The radio wave processor is any device capable of wireless communication, such as a transceiver, a receiver, or a transmitter. In addition, the radio wave processor may operate at any frequency band, such as 2.4 GHz, and is preferably operable at the 900 MHz bandwidth.

A control circuit 120 generally couples (or links) the electronic components of the lock and alarm system 100 so that information, preferably comprising unique bit streams, received by the radio wave processor 110 may be interpreted into various device commands, and also builds bit streams that are then sent to a remote control system 200. In addition, the control circuit 120 provides logic and electronic components to control the operation of mechanical devices, such as a locking mechanism that could be a locking actuator, for example, as well as electrical devices, such as a sound generator 140 that could be an alarm, for example.

The invention provides an input/output system 130. In some embodiments of the invention, the input/output system 130 includes a keypad having entry keys for manually entering information based on alphanumeric characters or symbols printed upon the entry keys. However, it should be understood that the input/output system 130 is not device limited, and could be comprised of any means that enables a user to enter a command or information into the lock and alarm system 100.

The sound generator 140 is capable of generating an audible alarm. For example, the alarm could be a high-pitched continuous audible sound. In other embodiments, the alarm sound could be an audible frequency of varying volume, a sound with broken intervals of silence, a sound with varying pitches, or some other audible pattern or series of patterns. In one embodiment, the sound generator 140 plays music, such as a school fight song. These different alarms could each be associated with different alarm conditions.

The locking mechanism 150 includes a securing means such as a cable or a bar (for example) that securably attaches to and immobilizes a bicycle. Thus, the locking mechanism 150 may provide security by preventing wheel movement, immobilizing the sprocket, attaching the bicycle to a stationary object, or otherwise securing the bicycle from theft. A power connector 160, enabled to receive a battery (not shown) provides power to the lock and alarm system 100, while an internal antenna 170 facilitates the reception and transmission of radio waves.

Also shown in FIG. 1 is a remote control system (the remote control system) 200, preferably having a key-ring receivable portion (not shown). A radio wave processor 210 for the remote control system 200 is similar to the radio wave processor 110 in that is can be a transceiver, a transmitter, or a receiver, and together with the radio wave processor 110 forms a wireless link that communicatively couples the remote control device 200 and the lock and lock and alarm system 100. The remote control device 200 also includes a control circuit 220, and an input/output device 230. Like the control circuit 120, the control circuit 220 generally links the electronic components of the remote control system 200 so that information, such as bit streams received by the radio wave processor 210 may be interpreted into various device commands, and provides logic and electronic components to control the operation of electrical and mechanical devices. Furthermore, the control circuit 220 builds the bit streams that provide control signals for the lock and alarm system 100.

A sound generator 240, also similar to the sound generator 140, provides the ability to sound an alarm for a user, whenever the user is away from the lock and alarm system 100, but within a transmission range from the lock and alarm system 100. The transmission range is dependent on the type of wireless system used for transmission, and may vary from a few hundred feet with a 900 MHz system, or a 2.4 GHz system, to a few miles with a wireless network, such as a PCS, CDMA, GSM, or CDPD cell phone/pager network. To supply energy to operate the remote control device's electronics, a power connector 250 is enabled to receive a battery. Likewise, an internal antenna 260 facilitates communication between the lock and alarm system 100 and the remote control system 200.

FIG. 2 shows an external diagram of a remotely controllable bicycle lock and alarm system with a remote control system, showing selected human interface components and their physical relationship to the internal systems. Consider that a remote control system 310 may include a physical key (not shown).

Also included in the remote control system 310 are a first button 312 and a second button 314 that permit the activation of selected functions. Although the buttons 312, 314 are illustrated as one half of a single hemisphere, it should be understood that the buttons 312, 314 may take different forms in other embodiments. For example, the buttons could be on either end of a generally rectangular toggle switch.

Typically, the buttons 312, 314 operate various remote control system functions. For example, the first button 312 could activate an "alarm on"(arm alarm) function, and the second button 314 could provide an "alarm off"(disarm alarm) function. In addition, the buttons 312, 314 could, when pressed, alternate the alarm from a first status to a second status, the second status being different from the fist status. Thus, if the first button 312 controls an alarm function, and the alarm is in a first state being the on state, then pressing the first button 312 turns the alarm to the off state. Similarly, if the first button 312 controls an alarm function, and the alarm is in a first state being the off state, then pressing the first button 312 turns the alarm to the on state.

The particular function activated may depend on the number of times the button is depressed within a short time frame (similar to clicking or double-clicking a mouse of a computer system). Other functions include lock and unlock, arm alarm and disarm alarm, lights on and lights off, and test alarm, for example. It will be recognized by those of ordinary skill in the art that other functions can be built in or programmed by a lock and alarm system user.

In a preferred embodiment, a third button 316 is a panic button that provides immediate activation of the audible alarm when the third button 316 is depressed. In other embodiments, the button 316 could activate another function. Of course, other buttons and keys may be provided in other embodiments and provide a number of functions.

Also depicted in FIG. 2 is a lock and alarm system 320 which includes a keypad 322 having a plurality of entry keys for manually providing information to the lock and alarm system, and the keypad may provide alphanumeric characters or symbols printed upon entry keys. The keypad 322 is used to program the lock and alarm system 320, and may be used to select a lock combination, and to enter a lock or unlock sequence if the remote control device is unavailable.

Further provided in the lock and alarm system 310 is a locking mechanism 326 that secures and releases a cable 324 or other securing means so to provide a mechanical structure that holds a bicycle component to a stationary object, or secures the bicycle in such a way as to make the bicycle immobile. In addition, a physical key slot (not shown) may receive a physical key in the event that the remote control device is unavailable. Preferably, for embodiments having a physical key, when a physical is inserted into slot and turned, a micro switch is activated that blocks the sounding of any audible alarm.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A remotely controllable bicycle lock and alarm system the lock and alarm system, consisting:
    a radio wave processor enabled to receive a communication from a remote control device;
    a control circuit coupled to the radio wave processor;
    a sound generator coupled to the control circuit;
    a locking mechanism coupled to the control circuit and wherein the control circuit is enabled to lock and unlock the locking mechanism; and
    an input/output system.

2. The lock and alarm system of claim 1 wherein the radio wave processor further comprises a remote control device capable of communication with the lock and alarm system, the remote control device for activating lock, unlock, and alarm functions.

3. The lock and alarm system of claim 1 wherein the radio wave processor is a transmitter.

4. The lock and alarm system of claim 1 wherein the radio wave processor is a receiver.

5. The lock and alarm system of claim 1 wherein the radio wave processor is a transceiver.

6. The lock and alarm system of claim 1 wherein the radio wave processor is enabled to transmit at a carrier frequency of 900 megahertz.

7. The lock and alarm system of claim 1 further comprising a lock and alarm system coupled to the locking mechanism.

8. The lock and alarm system of claim 1 wherein the input/output system comprises a keypad having entry keys for manually entering information based on alphanumeric characters or symbols printed upon the entry keys.

9. The lock and alarm system of claim 1 wherein the control circuit is an integrated circuit.

10. The lock and alarm system of claim 2 wherein the remote control device is enabled to generate a unique coded wireless bit stream that activates a lock function of the locking mechanism.

11. The lock and alarm system of claim 2 wherein a lock is enabled to generate a unique coded bit stream that is enabled to activate an alarm function in the remote control device.

12. The lock and alarm system of claim 2 wherein the remote control device is enabled to generate a unique coded bit stream that initiates a sound alarm function.

13. The lock and alarm system of claim 1 wherein the sound generator is enabled to generate an alarm when the lock and alarm system is tampered.

14. The lock and alarm system of claim 13 wherein an electrical closes a circuit to initiate the alarm.

15. The lock and alarm system of claim 1 wherein the control circuit is enabled to receive manual inputs from a keypad wherein the manual inputs program information.

16. The lock system of claim 1 wherein the locking mechanism is enabled to receive a physical, such that when the key is in the lock, the sound generator is disabled.

17. The lock and alarm system of claim 1 further comprising a locking closure.

18. The lock and alarm system of claim 1 wherein the locking closure is a conducting cable.

19. A remote control system the remote control system that is enabled to at least remotely lock and unlock a bicycle lock, the remote control system consisting:
    a radio wave processor enabled to receive a communication from a lock and alarm system;
    a locking mechanism coupled to the radio wave processor, and also coupled to a control circuit enabled to generate a bit stream that uniquely identifies a lock and alarm system code; and
    an input/output device coupled to the control circuit.

* * * * *